United States Patent
Garritsen et al.

(10) Patent No.: US 7,269,750 B1
(45) Date of Patent: Sep. 11, 2007

(54) METHOD AND APPARATUS FOR REDUCING POWER CONSUMPTION IN A GRAPHICS CONTROLLER

(75) Inventors: Frido Garritsen, Hayward, CA (US); Julia Chen, Cupertino, CA (US); Terry Chang, Sunnyvale, CA (US)

(73) Assignee: Silicon Motion, Inc., Milpitas, CA (US)

( * ) Notice: Subject to any disclaimer, the term of this patent is extended or adjusted under 35 U.S.C. 154(b) by 619 days.

(21) Appl. No.: 09/882,540

(22) Filed: Jun. 15, 2001

(51) Int. Cl.
*G06F 1/32* (2006.01)

(52) U.S. Cl. ...................... 713/322; 713/320

(58) Field of Classification Search ............... 713/320, 713/322, 324, 340; 345/204, 211, 212
See application file for complete search history.

(56) References Cited

U.S. PATENT DOCUMENTS

| | | | | |
|---|---|---|---|---|
| 5,349,525 A * | 9/1994 | Dunki-Jacobs et al. | ..... | 600/437 |
| 5,524,249 A * | 6/1996 | Suboh | ........... | 713/322 |
| 5,974,556 A * | 10/1999 | Jackson et al. | ........... | 713/322 |
| 5,991,883 A * | 11/1999 | Atkinson | ........... | 713/300 |
| 6,078,319 A * | 6/2000 | Bril et al. | ........... | 345/211 |
| 6,476,800 B2 * | 11/2002 | Millman et al. | ........... | 345/212 |
| 6,489,953 B1 * | 12/2002 | Chen | ........... | 345/213 |
| 6,618,042 B1 * | 9/2003 | Powell | ........... | 345/204 |
| 6,661,414 B1 * | 12/2003 | Miyamoto | ........... | 345/213 |
| 6,691,236 B1 * | 2/2004 | Atkinson | ........... | 713/320 |
| 6,697,033 B1 * | 2/2004 | Leung et al. | ........... | 345/5 |
| 6,704,879 B1 * | 3/2004 | Parrish | ........... | 713/322 |
| 6,721,881 B1 * | 4/2004 | Bian et al. | ........... | 713/1 |
| 6,763,478 B1 * | 7/2004 | Bui | ........... | 713/600 |
| 6,785,829 B1 * | 8/2004 | George et al. | ........... | 713/320 |
| 6,895,520 B1 * | 5/2005 | Altmejd et al. | ........... | 713/324 |

* cited by examiner

*Primary Examiner*—Chun Cao
(74) *Attorney, Agent, or Firm*—Blakely, Sokoloff, Taylor & Zafman LLP

(57) ABSTRACT

The invention in one embodiment is a method of managing power in a graphics controller. The method includes receiving a change indication related to a system power supply. The method also includes adjusting a first clock or adjusting a set of clocks including a first clock. The method further includes adjusting a controller power supply voltage.

36 Claims, 7 Drawing Sheets

METHOD AND APPARATUS FOR REDUCING POWER CONSUMPTION IN A GRAPHICS CONTROLLER

BACKGROUND OF THE INVENTION

1. Field of the Invention

This invention relates generally to the fields of graphics control and power management and more specifically to managing power consumption in a graphics controller subsystem.

2. Description of the Related Art

Computer systems have been implemented for years as desktop systems utilizing monitors. With the advent of laptop systems and of increasing awareness of power consumption in general, some moves have been made to cause central processing units and monitors to conserve power. However, other portions of a computer may also be used to conserve power. Furthermore, in laptops in particular, conserving battery power may prove to be of great importance to potential users. While companies such as AMD and Intel have been providing power sensitive central processing units, no power sensitive graphics controllers are currently available. Given that power-intensive nature of graphics controllers, taking advantage of potential power savings therein may enhance the value of systems using graphics controllers.

SUMMARY OF THE INVENTION

The invention in one embodiment is a method of managing power in a graphics controller. The method includes receiving a change indication related to a system power supply. The method also includes adjusting a first clock or adjusting a set of clocks including a first clock. The method further includes adjusting a controller power supply voltage.

BRIEF DESCRIPTION OF THE DRAWINGS

The present invention is illustrated by way of example and not limitation in the accompanying figures.

DETAILED DESCRIPTION

A method and apparatus for reducing power consumption in a graphics controller is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are embodiments mutually exclusive.

The method and apparatus incorporate power management into a graphics controller or processor. In one embodiment, a programmable voltage regulator is used to supply power to the graphics controller, such that the graphics controller may adjust the voltage of the regulator when a low-power condition (such as a switch from AC to battery power in a laptop computer) is detected. Additionally, in one embodiment, low-power conditions are detected by inserting a software routine into the operating system which intercepts the operating system power change signal and relays an indication of a power change to the graphics controller. Furthermore, in one embodiment, a video clock may be set to a lower clock rate for power savings, as the video clock often affects the power consumption of a monitor and may also affect the power consumption of the graphics controller due to processing demands. Moreover, in one embodiment, a memory clock may be set to a lower rate, thus slowing down memory accesses and thereby conserving power. In particular, in one embodiment, the memory clock rate is determined based on the state of the graphics controller. Additionally, a color lookup table and other portions of a graphics controller may be disabled or transitioned to a low-power mode to reduce power consumption. Furthermore, in one embodiment, the graphics controller may signal to the surrounding system that various other power saving measures, such as lowering a monitor supply voltage or turning down a monitor brightness may be appropriate.

The invention in one embodiment is a method of managing power in a graphics controller. The method includes receiving a change indication related to a system power supply. The method also includes adjusting a first clock or a set of clocks. The method further includes adjusting a controller power supply voltage. The method may also include powering down or otherwise disabling one or more portions of circuitry.

Figure 1:
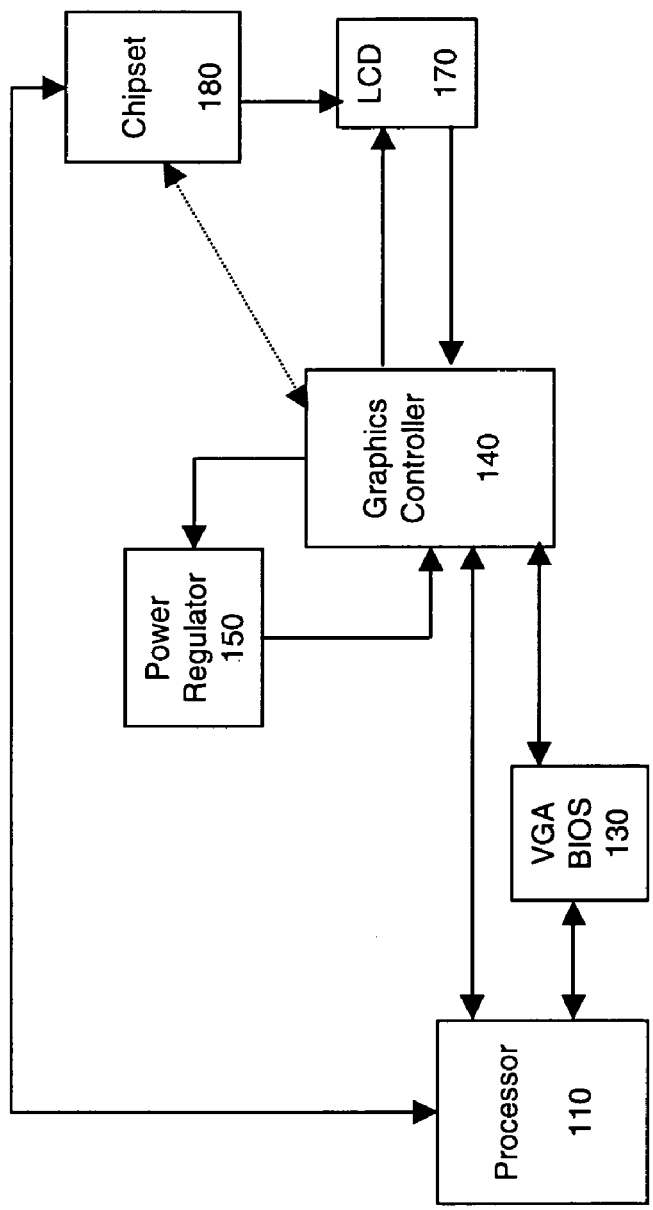
FIG. 1 illustrates a block diagram of an embodiment of a system.

Turning to the drawings, FIG. 1 illustrates a block diagram of an embodiment of a system. Processor 110 may interact with the graphics controller 140 either directly or through VGA BIOS 130. Graphics controller 140 is supplied with power by power regulator 150, which receives its power from the system power supply (not shown). Power regulator 150 also may receive a signal from graphics controller 140 which may trigger a change in the voltage at which power is supplied to graphics controller 140. In one embodiment, power regulator 150 normally supplies power at 2.5 V, and supplies power at 2.0 V under power saving conditions indicated by the signal from graphics controller 140. In an alternate embodiment, power regulator 150 normally supplies power at 3.3 V, and supplies power at 2.5V under power saving conditions indicated by the signal from graphics controller 140. In one embodiment, the voltage regulator is a model VT101, VT102 or VT103, each of which is available from the Volterra corporation.

Coupled to graphics controller 140 is also LCD 170 which is a liquid crystal display. Graphics controller 140 controls some aspects of the operation of LCD 170, and the video clock used by LCD 170 may be supplied by graphics controller 140. Note that the video clock used by LCD 170 may be set to a lower clock rate (frequency) than the clock rate for graphics controller 140. Also coupled to processor 110 and LCD 170 is chipset 180, which controls other aspects of operation of LCD 170. Chipset 180 may control the supply voltage and brightness of LCD 170 for example. In one embodiment, chipset 180 and graphics controller 140 are coupled directly, allowing for communication directly between the graphics controller 140 and the chipset 180. Note that chipset 180 and other components of FIG. 1 may take on a variety of forms, such as a single integrated circuit (IC) implementation, multiple IC implementation, or discrete implementations within the spirit and scope of the invention.

Figure 2:
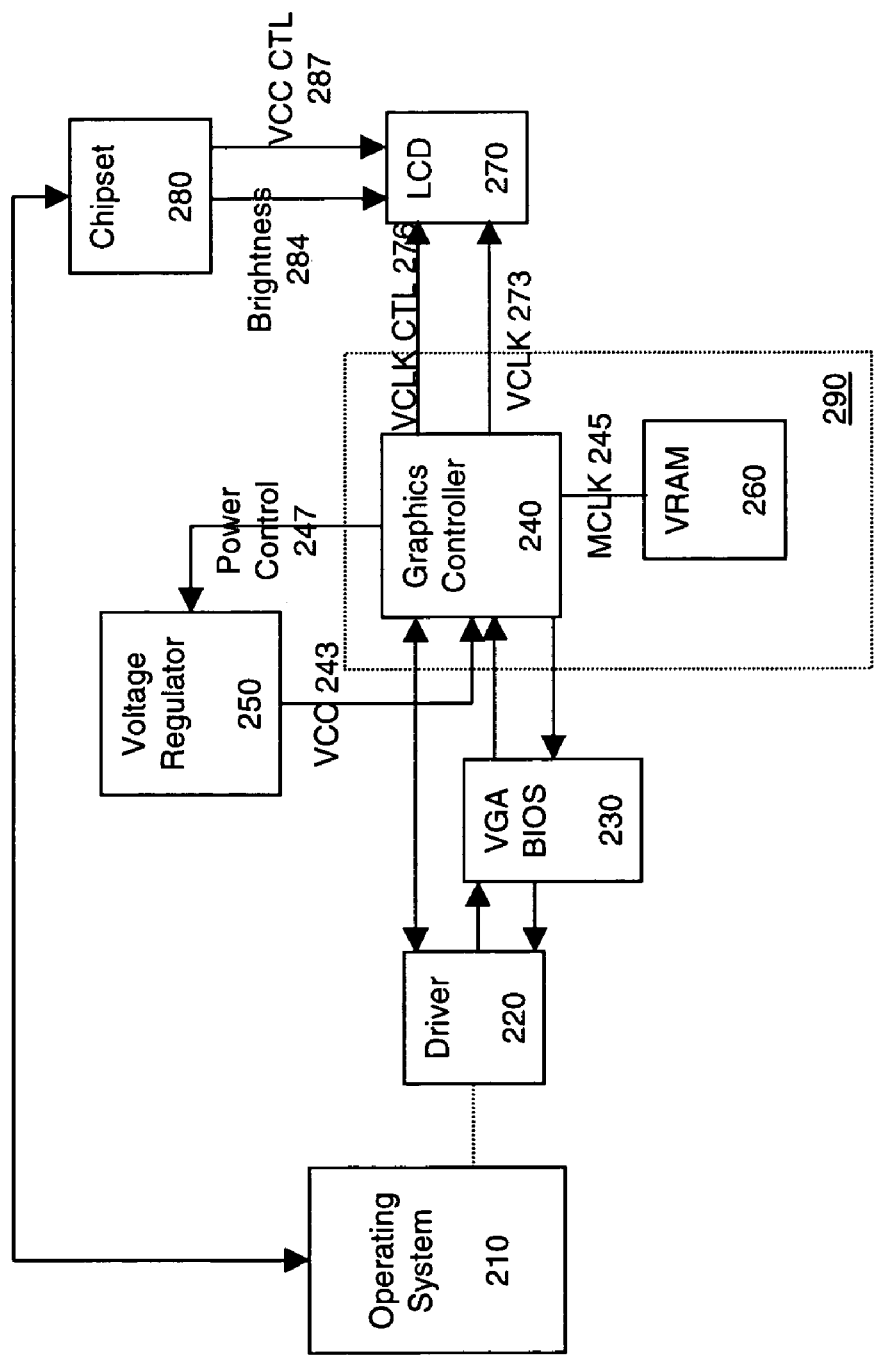
FIG. 2 illustrates an alternate embodiment of a system.

FIG. 2 illustrates an alternate embodiment of a system. Note that the embodiments illustrated in FIGS. 1 and 2 may be similar or the same, depending on implementation by one skilled in the art. Operating system 210 is coupled to or includes driver 220. Driver 220 communicates with graphics controller 240 either directly or through VGA BIOS 230, thus allowing operating system 210 to communicate with graphics controller 240. Graphics controller 240 receives its power from voltage regulator 250 through Vcc 243, and controls the power output of voltage regulator 250 through Vcc control 247. Graphics controller is also coupled to VRAM 260 through at least MCLK 245, a clock signal, and potentially other signals or buses as appropriate. Furthermore, graphics controller 240 is coupled to LCD 270 through at least VCLK 273 and VCLK control 276. VCLK 273 is a clock signal and VCLK control 276 is a control signal which indicates which clock frequency is in use. LCD 270 is also coupled to chipset 280 through at least brightness 284 and Vcc 287. Vcc 287 supplies power to the LCD 270 (with chipset 280 functioning as a power supply or regulator) and brightness 284 indicates what brightness level the LCD 270 should use to operate. Chipset 280 is also coupled to the operating system 210, possibly through a separate BIOS for example. Note that the VCLK control 276 signal may not be included in some implementations or embodiments, as the VCLK may shift without a corresponding control signal. Furthermore, note that component 290 includes both the graphics controller 240 and the memory (VRAM 260), as those two portions of the system may easily be integrated to form a single component.

FIG. 3A illustrates an embodiment of a method of reducing power consumption. At block 310, a change in power supply is detected, such as by an operating system which receives a signal from underlying system power management hardware. Additionally, this signal is, in one embodiment, intercepted by a driver for a graphics controller, which provides an indication of the change to the graphics controller. At block 320, the graphics or VGA BIOS is informed of a switch in power supply modes by the graphics controller. This process of informing may also include a request for a set of preprogrammed clock rate values which are stored in the VGA BIOS and programmed by the operating system in one embodiment. At block 330, the video clock for the LCD (a first clock for example) is adjusted to a lower rate or frequency. At block 340, a graphics controller power supply voltage is programmed for a lower voltage level or other wise adjusted. At block 350, the system is notified that changing brightness of the monitor may be appropriate for power saving purposes. At block 360, a set of available clock rates is returned from the VGA BIOS. At block 370, the state of the graphics controller is checked, such as determining whether a 3D engine or a 2D engine is active. Based on the state of the graphics controller, at block 380, an available clock rate from the set of clock rates is chosen for a memory clock (a second clock for example) and the memory clock is set to run at the available clock rate. It will be appreciated that the memory clock may effectively remain unchanged (at the same clock rate) as appropriate due to the type of graphics activity occurring in the system. At block 390, again based on the state of the graphics controller, the CLUT (color lookup table) is disabled if possible, thus further saving power.

FIG. 3B illustrates an embodiment of a method of restoring normal power usage. At block 315, a change in the underlying power system is detected, such as by the operating system when a laptop switches to AC power. Similarly, this signal is intercepted and relayed to the graphics controller. At block 325, the VGA BIOS is informed of the switch by the graphics controller to full power mode. At block 335, the video clock is adjusted to an optimal speed independent of power considerations. At block 345, the graphics controller power supply voltage is programmed for a higher voltage level. At block 355, the system is notified that increasing brightness or other operating parameters of a monitor may be appropriate. At block 375, a memory clock is set to a higher level, either as determined within the graphics controller or from a set of clock rates provided by the VGA BIOS. At block 385, the CLUT is enabled, thus taking advantage of power to enhance performance.

Figure 4:
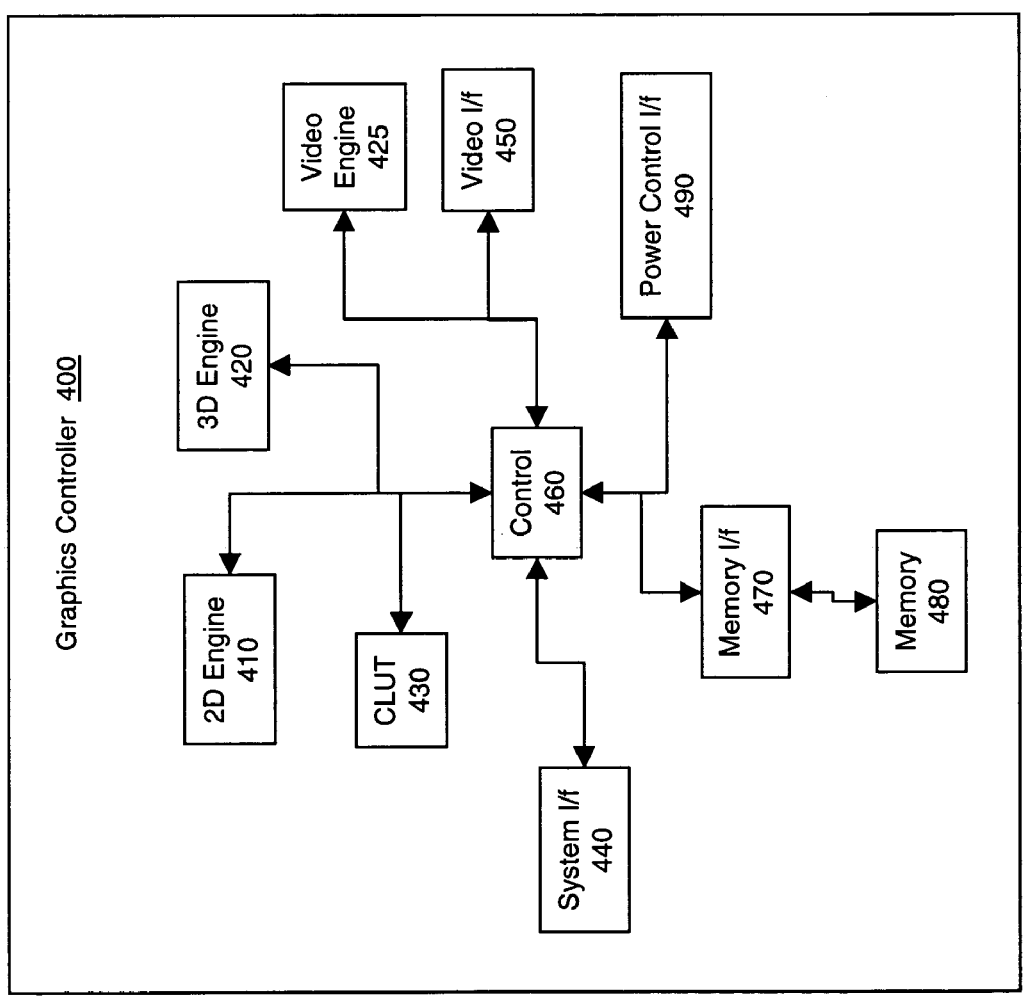
FIG. 4 illustrates an embodiment of a graphics controller.

FIG. 4 illustrates an embodiment of a graphics controller. Graphics controller 400 includes the various components illustrated. 2D engine 410 may be used for rendering two-dimensional graphics. 3D engine 420 may be used for rendering three-dimensional graphics. Video engine 425 may be used to process motion video. CLUT 430 is a color lookup table suitable for quickly translating stored color values for rendering purposes.

System interface 440 may be coupled to the rest of a system, such as a processor or VGA BIOS, allowing for communication between the graphics controller and the system, such as when a power supply switch occurs. Video interface 450 may be coupled to a monitor such as an LCD and may include both a VCLK video clock signal. Memory control interface 470 may be coupled to memory 480 and used to control and transfer information to and from memory 480. Memory control interface 470 may include a memory clock MCLK which may be used to synchronize signals with memory 480. Memory 480 need not be incorporated in the same physical package as graphics controller 400, provided that memory 480 is coupled to memory control interface 470. Power control interface 490 may be coupled to a power supply internal or external to the graphics controller 400, for purposes of controlling the power supply.

Controller 460 is coupled to all of the previously mentioned components or blocks, and may be used to coordinate their operations to achieve performance of the graphics control operations. The components of graphics controller 400 may be implemented as portions of circuitry, such that 2D engine 410 may represent a first portion of circuitry for example. Note that 2D engine 410 and 3D engine 420 may be effectively turned off (powered down) depending on the modes of operation of the graphics controller, thus allowing for power savings.

Figure 3:
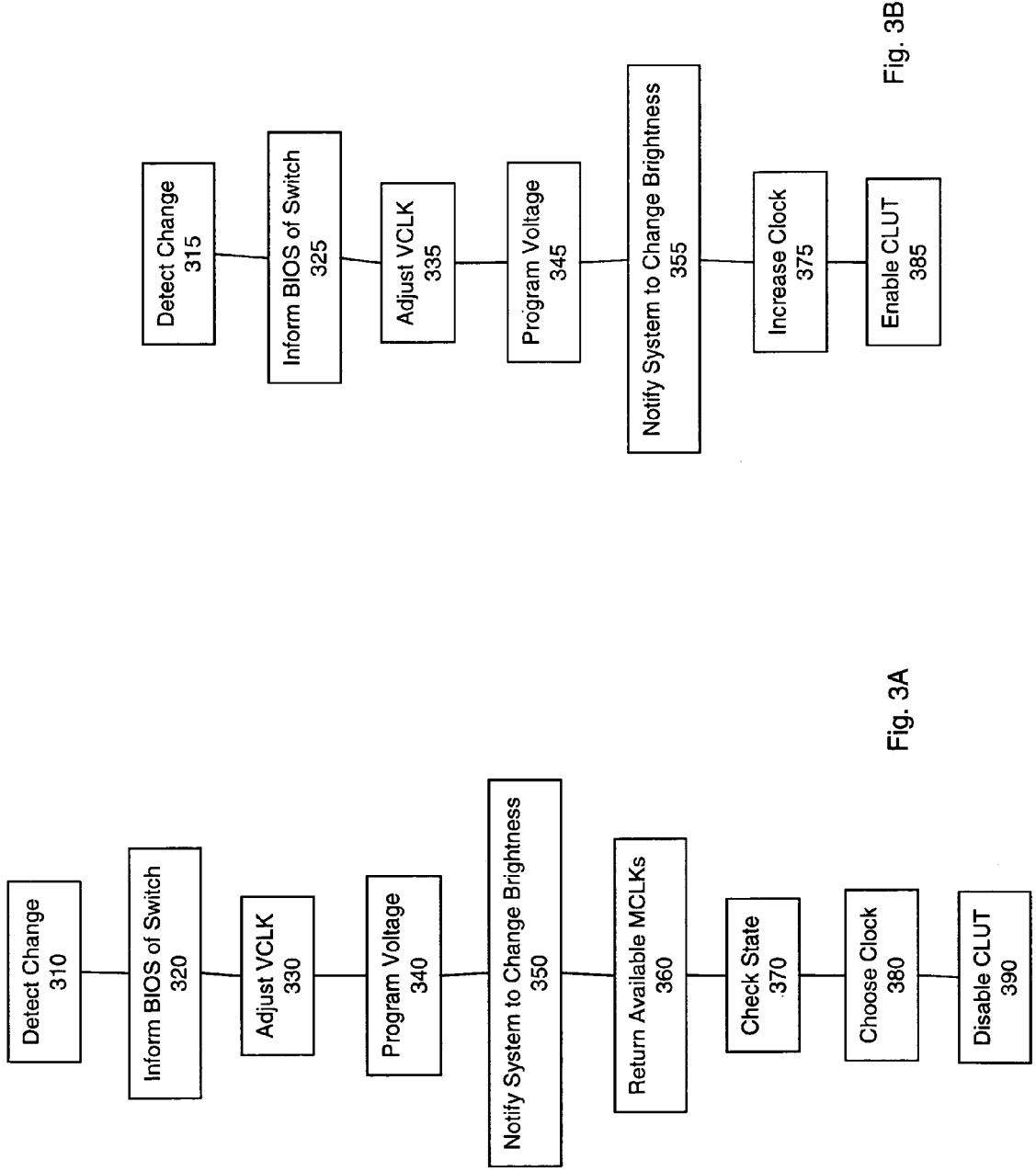
FIG. 3A illustrates an embodiment of a method of reducing power consumption.
FIG. 3B illustrates an embodiment of a method of restoring normal power usage.
Figure 5:
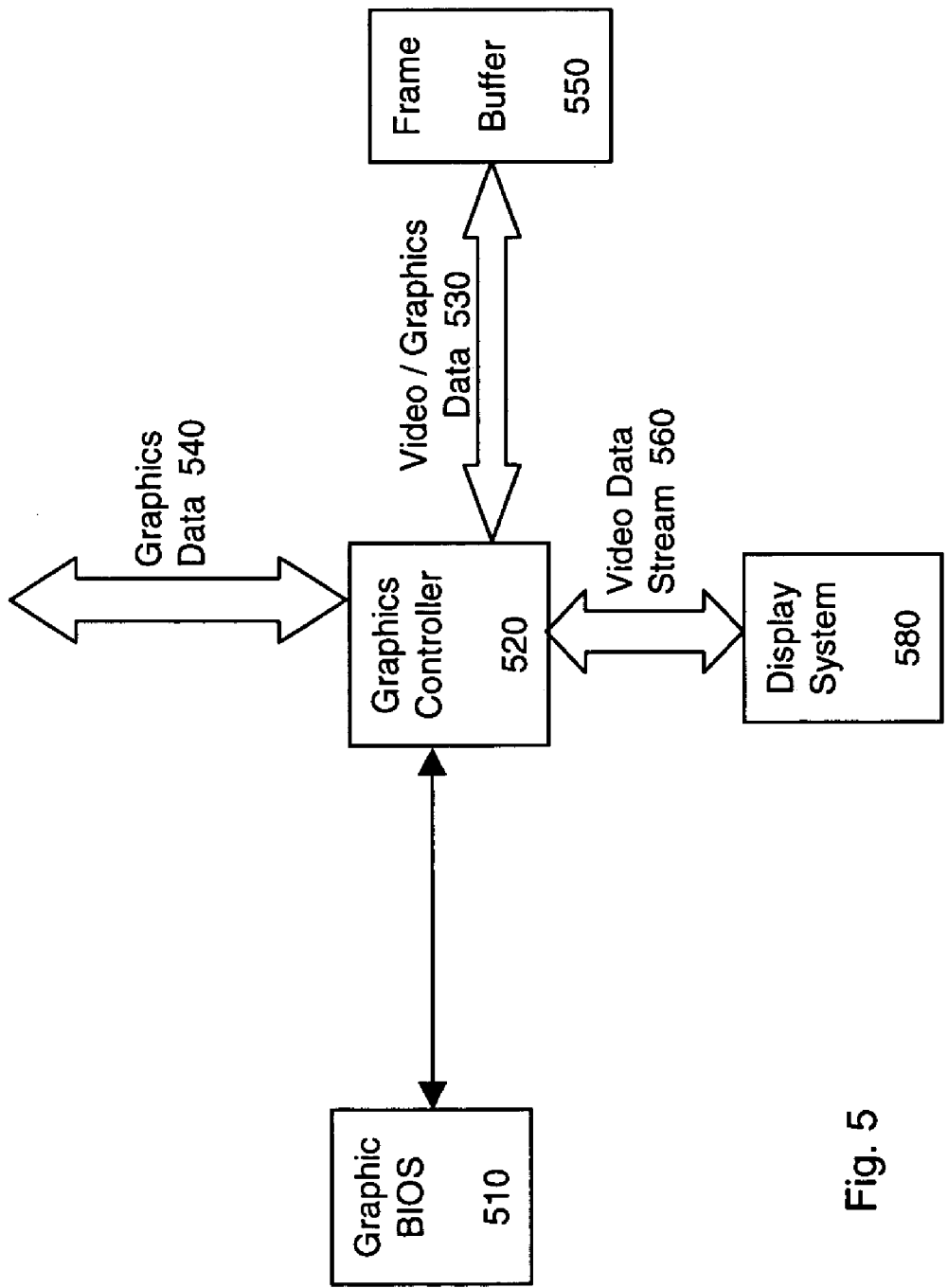
FIG. 5 illustrates one embodiment of a graphics subsystem which may incorporate the invention.

Turning to FIG. 5, a graphics subsystem which may incorporate the invention is illustrated. Graphics BIOS 510 is the built in operating system of the graphics subsystem. It contains routines which may be used by graphics controller 520 and it may also be designed to effectively run an operating system on graphics controller 520 such that this operating system may monitor the data flowing to graphics controller 520. Graphics controller 520 receives and sends out graphics data 540 and video and graphics data 530. Video and graphics data 530 is sent and received by frame buffer 550. Graphics controller 520 also sends video data stream 560 which typically goes to the display system 580, such as a liquid crystal display or cathode ray tube display. Graphics data 540, in one embodiment, is the graphics data supplied from an underlying computer system attached to the graphics subsystem. It is this data which is monitored by the operating system running on graphics controller 520 to determine what resolution or what display mode is being utilized. Video and graphics data 530 is, in some circumstances, the actual data sent to the display. That data is translated from graphics data 540 by graphics controller 520. As a result video and graphics data 530 may or may not resemble graphics data 540 even though it effectively encodes the same image. It will be appreciated that in one embodiment of the invention the components illustrated in FIGS. 2 and 3 are incorporated within graphics controller 520 as registers and other logic within the processor that are subject to the control of routines from graphics BIOS 510 running on graphics controller 520.

Figure 6:
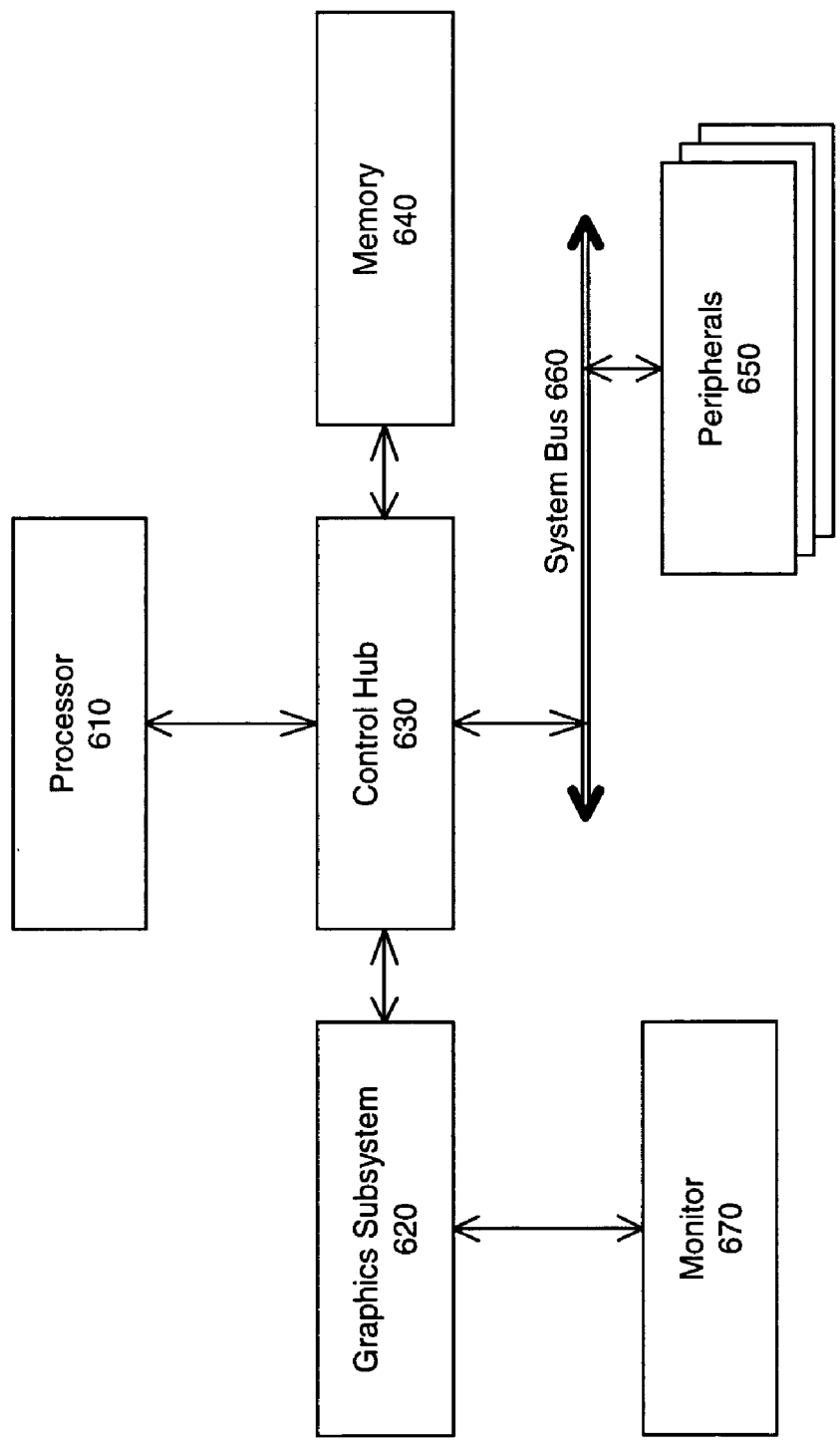
FIG. 6 illustrates one embodiment of a system which may incorporate the graphics subsystem which may incorporate the invention.

Turning to FIG. 6, a system utilizing the invention is illustrated. Processor 610 is coupled to control hub 630. Control hub 630 is also coupled to graphics subsystem 620, to memory 640 and to system bus 660. Control hub 630 may be an AGP or PCI controller for example. Alternatively, control hub 630 may represent a combination of a north bridge and south bridge for example. System bus 660 is coupled to peripherals 650. Graphics subsystem 620 is also coupled to monitor 670. Graphics subsystem 620 may receive instructions and data from control hub 630. It may also request data from memory 640 through control hub 630 and likewise request interrupts to processor 610 through control hub 630 and request information or data from peripherals 650 through control hub 630 and system bus 660. Processor 610 may control memory 640, system bus 660 and peripherals 650 in graphics subsystem 620 and monitor 670 through control hub 630. In one embodiment graphics subsystem 620 incorporates all of the components illustrated in FIG. 5 such as the graphics BIOS 510, graphics controller 520 and frame buffer 550. In that embodiment graphics data 540 is transmitted and received along the coupling between graphics subsystem 620 and control hub 630. Video data 560 is transmitted and received along the coupling between graphics subsystem 620 and monitor 670.

Figure 7:
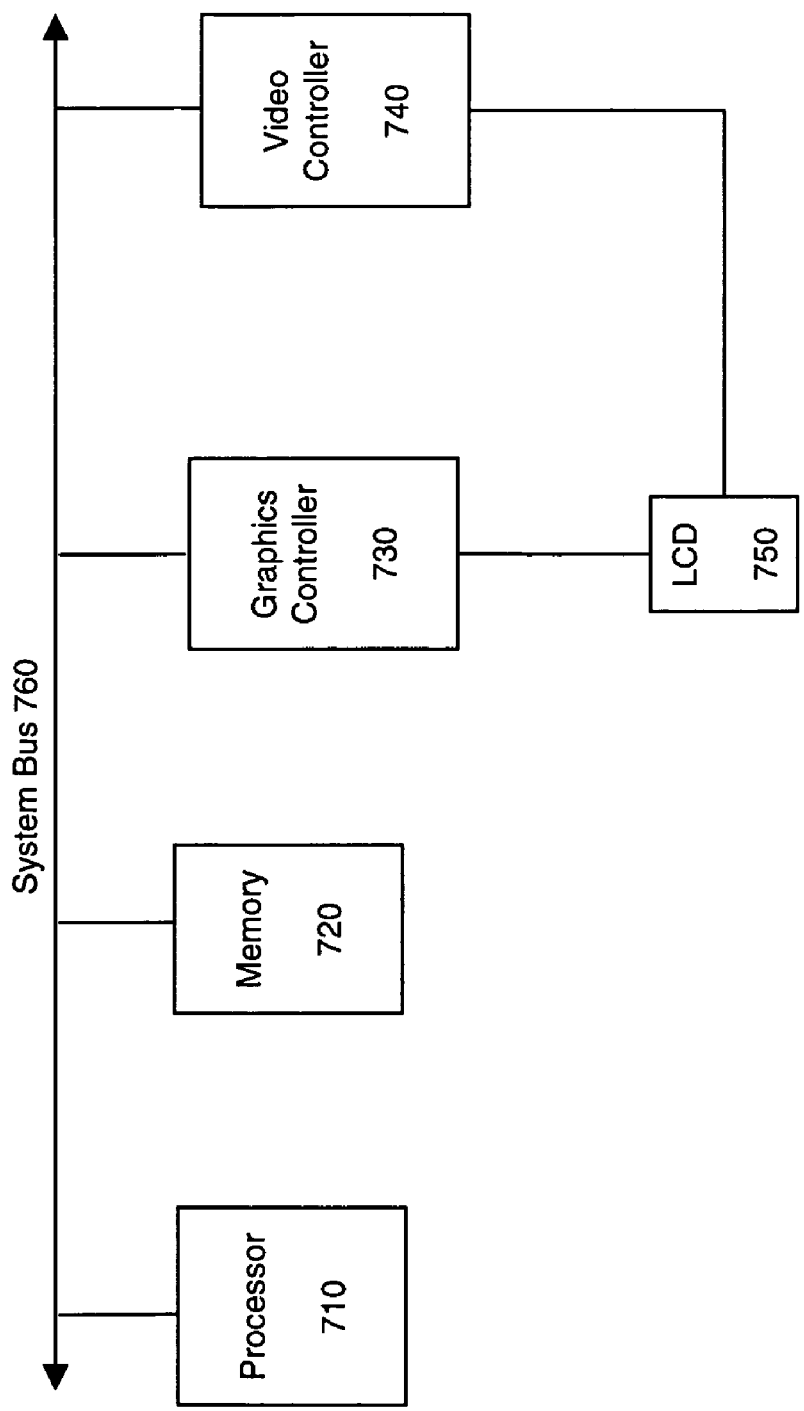
FIG. 7 illustrates another alternate embodiment of a system.

FIG. 7 illustrates another alternate embodiment of a system. Processor 710 is coupled to a bus 760, such as a PCI bus. Memory 720 is also coupled to the bus 760, as is graphics controller 730 and video controller 740. Both video controller 740 and graphics controller 730 are coupled to LCD 750, a liquid crystal display.

In the foregoing detailed description, the method and apparatus of the invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method of managing power in a graphics controller, which is to be coupled to a processor through a bus, comprising:

receiving a change indication related to a system power supply;

adjusting a first clock, wherein the first clock includes a video clock for a display;

adjusting through a voltage regulator, a graphics controller power supply voltage level in response to the receiving of the change indication related to the system power supply; and informing by the graphics controller a Video Graphics Array Basic Input/Output System ("VGA BIOS") with an indication of a change related to the system power supply, wherein the informing includes requesting a set of one or more preprogrammed available clock rates stored in the VGA BIOS;

receiving the set of one or more available clock rates;

checking a state of the graphics controller that includes determining whether a 3D engine or 2D engine is active; and choosing a desired clock rate from the set of available clock rates based on the checking.

2. The method of claim 1 further comprising:

adjusting a second clock to conform to the desired clock rate; and wherein:

adjusting the first clock comprises reducing a rate of the first clock; and adjusting the graphics controller power supply voltage level comprises reducing the graphics controller power supply voltage level.

3. The method of claim 2 further comprising:

disabling a CLUT.

4. The method of claim 3 wherein:

disabling the CLUT responsive to checking the state of the graphics controller.

5. The method of claim 4 further comprising notifying a system to reduce brightness of a display.

6. The method of claim 5 wherein notifying the system comprises notifying a chipset directly.

7. The method of claim 2 further comprising disabling a first portion of circuitry of the graphics controller.

8. The method of claim 7 wherein disabling the first portion of circuitry responsive to checking the state of the graphics controller.

9. The method of claim 8 further comprising enabling the first portion of circuitry of the graphics controller.

10. The method of claim 1 wherein the graphics controller power supply voltage level is associated with a graphics controller power supply internal to the graphics controller.

11. The method of claim 1 wherein the graphics controller power supply voltage level is associated with a graphics controller power supply external to the graphics controller, and adjusting the graphics controller power supply voltage level includes programming the graphics controller power supply with a signal.

12. The method of claim 1 wherein adjusting the first clock comprises increasing a rate of the first clock; and adjusting the graphics controller power supply voltage level comprises increasing the graphics controller power supply voltage level.

13. The method of claim 12 further comprising increasing a clock rate of the second clock.

14. The method of claim 13 further comprising enabling a CLUT.

15. The method of claim 1 further comprising
detecting a change related to a system power supply.

16. The method of claim 15 further comprising
installing a software routine in a system containing the graphics controller, the software routine suitable for detecting the change related to the system power supply.

17. A method of effecting power management of a graphics controller, which is to be coupled to a processor through a bus, in an operating system comprising:
   programming a set of available clock frequencies and storing the set of the available clock frequencies in a Video Graphics Array Basic Input/Output System ("VGA BIOS");
   detecting a change in a system power supply;
   notifying the graphics controller of the change;
   receiving an indication of power reduction in the graphics controller, wherein the receiving the indication includes receiving a request from the graphics controller for the set of preprogrammed available clock frequencies stored in the VGA BIOS;
   providing the set of available clock frequencies to the graphics controller to choose a desired clock rate from the set of available clock rates based on determining of a state of the graphics controller, wherein the determining of the state includes determining whether a 3D engine or a 2D engine is active, and
   adjusting through a voltage regulator a power supply voltage level supplied to the graphics controller in response to the receiving of the indication the power reduction in the graphics controller.

18. The method of claim 17 further comprising
receiving a signal from the graphics controller to reduce brightness of a display.

19. The method of claim 18 further comprising
reducing brightness of the display.

20. The method of claim 19 further comprising
receiving a software routine suitable for notifying the graphics controller, wherein notifying the graphics controller comprises executing the software routine.

21. A graphics controller, which is to be coupled to a processor through a bus, comprising:
   a power supply input configured to receive power at a range of voltages from a voltage regulator;
   a power supply control output to provide a trigger signal to the voltage regulator to change a voltage level supplied to the graphics controller through the power supply input when a change indication related to a system power supply is detected;
   a first clock output that provides an adjustable video clock for a display, and
   a system power supply change input coupled to the first clock output and to the power supply control output to detect the change indication related to the system power supply; and
   a system interface coupled to the system power supply change input;
   a 2D engine;
   a 3D engine;
   a control unit coupled to the system interface, the 2D engine, and the 3D engine, wherein the control unit is configured to inform a Video Graphics Array Basic Input/Output System ("VGA BIOS") through the system interface about the change indication related to the system power supply, wherein the informing includes requesting a set of one or more preprogrammed available clock rates stored in the VGA BIOS, wherein the control unit is to choose a desired clock rate from the set of available clock rates based on determining of a state of the graphics controller, wherein the determining of the state includes determining whether the 3D engine or the 2D engine is active.

22. The graphics controller of claim 21 further comprising a first clock control output.

23. The graphics controller of claim 22 further comprising a memory coupled to the first clock output.

24. The graphics controller of claim 22 further comprising
a second clock output; and
a second clock control output.

25. The graphics controller of claim 24 further comprising a memory coupled to the first clock output.

26. The graphics controller of claim 25 wherein:
the memory is integrated with other portions of the graphics controller on a single substrate.

27. The graphics controller of claim 25, wherein
the voltage regulator is coupled to the power supply input and the power supply control output to provide the voltage to the graphics controller based on the trigger signal from the graphics controller.

28. The graphics controller of claim 27 wherein
the voltage regulator is integrated with other portions of the graphics controller on a single substrate.

29. The graphics controller of claim 28 further comprising a VGA BIOS.

30. The graphics controller of claim 24 further comprising
a brightness output configured to signal to a system that a reduction in brightness of a display is appropriate.

31. The graphics controller of claim 30 wherein
the brightness output is suitable for coupling directly to a video control chipset.

32. The graphics controller of claim 30 further comprising
a CLUT coupled to the 3D engine and coupled to the 2D engine;
a system interface including the system power supply input;
a video interface including the second clock output and the second clock control output;
a power control interface including the power supply input and the power supply control output;
a memory control interface including the first clock output; and
wherein the control unit is coupled to the system interface, the CLUT, the video interface, the power control interface, the memory control interface, the 2D engine and the 3D engine.

33. The graphics controller of claim 21, wherein the graphics controller is coupled to send data to and receive data from a frame buffer.

34. A graphics controller, which is to be coupled to a processor through a bus, comprising:
   a power supply input configured to receive power at a range of voltage levels from a power regulator;
   a power supply control output to provide a trigger signal to the power regulator to change a voltage level supplied to the graphics controller when a change indication related to a system power supply is detected;
   a first clock output that provides an adjustable video clock for a display;
   a system power supply change input;
   a first clock control output;
   a second clock output;
   a second clock control output;
   a brightness output configured to signal to a system that a reduction in brightness of a display is appropriate;

a 2D engine;

a 3D engine;

a CLUT coupled to the 3D engine and coupled to the 2D engine;

a system interface including the system power supply input;

a control unit coupled to the system interface that is configured to inform a Video Graphics Array Basic Input/Output System ("VGA BIOS") about the change indication related to the system power supply, wherein the informing includes requesting a set of one or more preprogrammed available clock rates stored in the VGA BIOS, wherein the control unit is to choose a desired clock rate from the set of available clock rates based on determining of a state of the graphics controller, wherein the determining of the state includes determining whether the 3D engine or the 2D engine is active;

a video interface including the second clock output and the second clock control output;

a power control interface including the power supply input and the power supply control output;

a memory control interface including the first clock output; and wherein the control unit is coupled to the system interface, the CLUT, the video interface, the power control interface, the memory control interface, the 2D engine and the 3D engine.

35. A method of managing power in a graphics controller, which is to be coupled to a processor through a bus, comprising receiving a change indication related to a system power supply;

reducing a rate of a first clock, wherein the first clock includes a video clock for a display;

reducing a graphics controller power supply voltage level through a voltage regulator after the change indication is received;

signaling a BIOS with the change indication related to the system power supply by the graphics controller, wherein the signaling the BIOS includes requesting for a set of one or more available clock rates stored in the BIOS, wherein the control unit is to choose a desired clock rate from the set of available clock rates based on determining of a state of the graphics controller, wherein the determining of the state includes determining whether a 3D engine or a 2D engine is active;

receiving a set of one or more available clock rates;

checking a state of the graphics controller;

choosing a desired clock rate from the set of available clock rates;

adjusting a second clock to conform to the desired clock rate;

disabling a first portion of circuitry responsive to checking the state of the graphics controller.

36. The graphics controller of claim 34, wherein the graphics controller is coupled to send data to and receive data from a frame buffer.

* * * * *